UNITED STATES PATENT OFFICE.

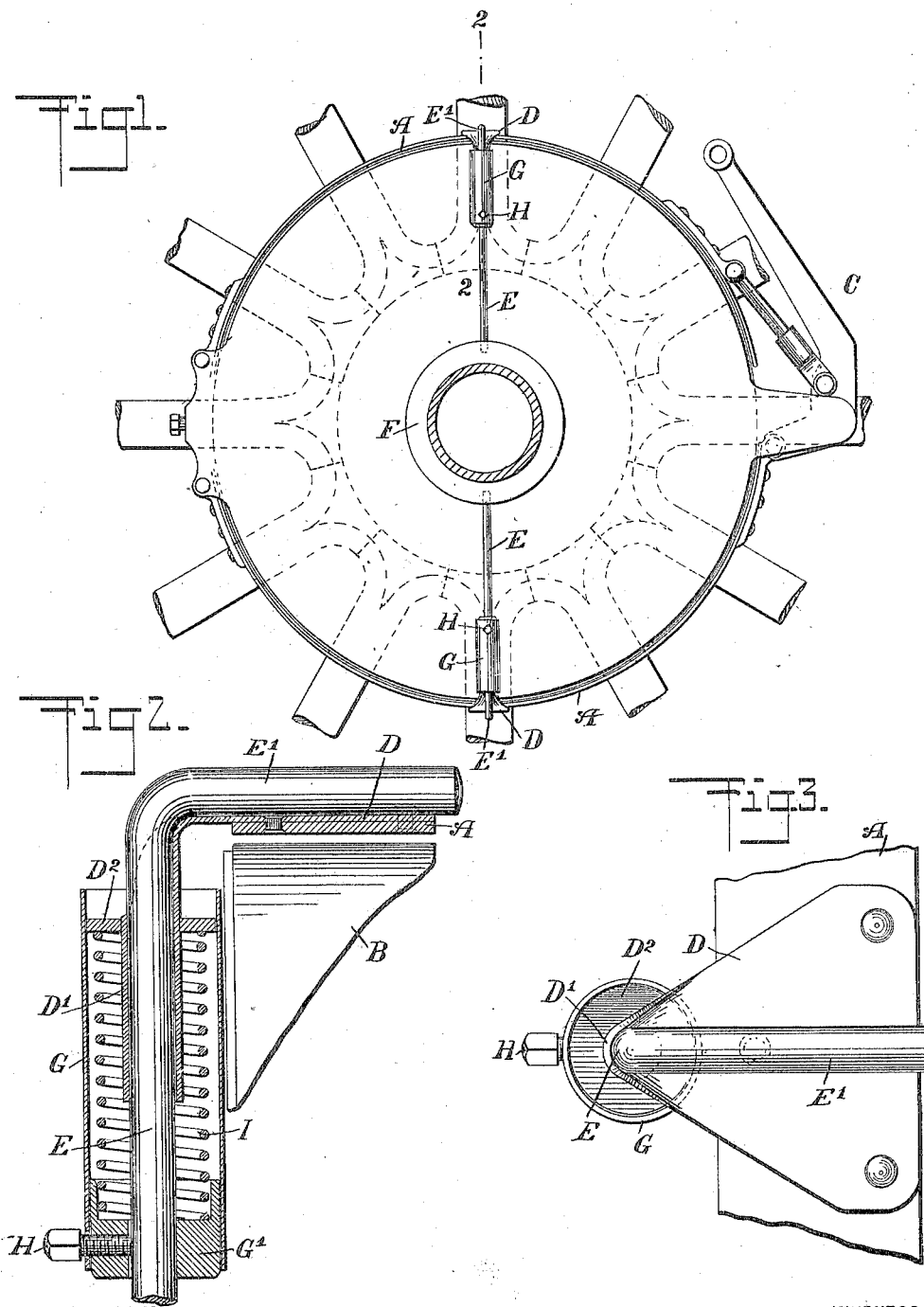

JOHN EVANS, OF UTICA, NEW YORK, ASSIGNOR OF ONE-HALF TO CHESTER FITCH, OF UTICA, NEW YORK.

ANTIRATTLING DEVICE FOR BRAKE-BANDS.

947,628. Specification of Letters Patent. Patented Jan. 25, 1910.

Application filed May 4, 1909. Serial No. 493,853.

*To all whom it may concern:*

Be it known that I, JOHN EVANS, a citizen of the United States, and a resident of Utica, in the county of Oneida and State of New York, have invented a new and Improved Antirattling Device for Brake-Bands, of which the following is a full, clear, and exact description.

The invention relates to the brake mechanism, such as is used on automobiles and other machines, and its object is to provide a new and improved device for preventing rattling of the brake band while the machine is running and the brake band is not in use, the device not interfering with the application of the brake whenever it is desired to do so.

For the purpose mentioned, the brake band is attached intermediate its ends by yielding supports, which hold the brake band normally out of contact with the brake wheel, but allow of drawing the brake band into contact with the brake wheel.

A practical embodiment of the invention is represented in the accompanying drawings forming a part of this specification, in which similar characters of reference indicate corresponding parts in all the views.

Figure 1 is a side elevation of the improvement as applied to the brake band of an automobile; Fig. 2 is an enlarged transverse section of the same on the line 2—2 of Fig. 1; and Fig. 3 is a plan view of the same.

The brake band A shown in the drawings, is of the usual construction, and operates in conjunction with the brake wheel B for braking the automobile whenever the operator manipulates the brake-operating mechanism C for applying the brake.

The brake band A is riveted or otherwise secured, intermediate its ends, to one, two or more plates D, each provided with an angular tubular extension D', mounted to slide on a rod E, extending radially and secured to the axle F or other fixed part of the automobile.

On the rod E is adjustably secured a casing G, by the use of a set screw H, and in the said casing G is arranged a coil spring I, resting with one end on the casing end G² and pressing with its other end against a collar $D^2$, secured to or formed on the tubular extension D' of the plate D. Now by the arrangement described, the spring I presses the plate D in an outward direction, to normally hold the brake band A out of contact with the peripheral face of the brake wheel B. The outward movement of the plate D is limited by a stop arm E', forming an angular extension of the rod E, as plainly shown in the drawings. Now when the operator actuates the brake-operating mechanism C for applying the brake, then the brake band A is drawn into contact with the peripheral face of the brake wheel B in the usual manner, and the brake band A readily carries the plate D along against the tension of the spring I, and when the operator releases the brake-operating mechanism C, the brake band A is immediately moved out of contact with the peripheral face of the brake wheel B and held out of contact by the action of the spring-pressed plate D, as previously explained.

Thus by the arrangement described, the brake band is not liable to rattle when not in use, as it is held firmly in the dormant position or inactive position, but the brake band can be readily moved into braking position on the operator actuating the mechanism C, in the usual manner.

Having thus described my invention, I claim as new and desire to secure by Letters Patent:

1. An anti-rattling device for brake bands, comprising a fixed rod provided with an angular arm, a plate secured to the brake band and adapted to rest against the said arm, the said plate having an extension, a casing attached to the said rod and into which extends the said extension, and a spring in the said casing pressing the said extension.

2. An anti-rattling device for brake bands, comprising a fixed rod provided with an angular arm, a plate secured to the brake band and adapted to rest against the said arm, the said plate having a tubular extension provided with a collar, the said extension being mounted to slide on the said rod, a casing adjustably secured on the said rod, and a spring within the said casing and pressing the said collar.

3. In a device of the class described, the combination with the brake wheel and the brake band, of a rod arranged substantially radial to the wheel and having one end fixed and the other slidably connected with the band a casing adjustably secured to the rod, and a spring between the casing and the brake band.

In testimony whereof I have signed my name to this specification in the presence of two subscribing witnesses.

JOHN EVANS.

Witnesses:
  KATHRYN M. O'HANLON,
  PASCAL DE ANGELIS.